US008880498B2

(12) United States Patent
Rubanovich et al.

(10) Patent No.: US 8,880,498 B2
(45) Date of Patent: Nov. 4, 2014

(54) SYSTEM AND METHOD FOR AGGREGATING AND RANKING DATA FROM A PLURALITY OF WEB SITES

(75) Inventors: Michael Rubanovich, Haifa (IL); Dmitry Babitsky, Haifa (IL)

(73) Assignee: Fornova Ltd., Yoqneam Ilit (IL)

( * ) Notice: Subject to any disclaimer, the term of this patent is extended or adjusted under 35 U.S.C. 154(b) by 298 days.

(21) Appl. No.: 12/567,773

(22) Filed: Sep. 27, 2009

(65) Prior Publication Data
US 2010/0169301 A1 Jul. 1, 2010

Related U.S. Application Data

(60) Provisional application No. 61/193,862, filed on Dec. 31, 2008.

(51) Int. Cl.
*G06F 17/30* (2006.01)
(52) U.S. Cl.
CPC ...... *G06F 17/30864* (2013.01); *G06F 17/3089* (2013.01)
USPC ............ 707/709; 707/723; 707/737; 707/769
(58) Field of Classification Search
CPC .................. G06F 17/30869; G06F 17/3089
USPC ........... 707/709, 723, 737, 769, 812; 715/700
See application file for complete search history.

(56) References Cited

U.S. PATENT DOCUMENTS

| | | | |
|---|---|---|---|
| 5,659,732 A | 8/1997 | Kirsch | |
| 6,012,053 A | 1/2000 | Pant | |
| 6,067,552 A | 5/2000 | Yu | |
| 6,275,820 B1 | 8/2001 | Navin-Chandra | |
| 7,240,067 B2 | 7/2007 | Timmons | |
| 7,246,306 B2 * | 7/2007 | Chen et al. | 715/205 |
| 7,739,258 B1 | 6/2010 | Halevy et al. | |
| 7,930,302 B2 * | 4/2011 | Bandaru et al. | 707/737 |
| 8,060,518 B2 | 11/2011 | Timmons | |
| 8,065,286 B2 | 11/2011 | Jones | |
| 2004/0002973 A1 | 1/2004 | Chaudhuri | |
| 2004/0199497 A1 | 10/2004 | Timmons | |

(Continued)

FOREIGN PATENT DOCUMENTS

| | | | |
|---|---|---|---|
| EP | 2225676 A2 | 9/2010 | |
| EP | 2504779 A2 | 10/2012 | |

(Continued)

OTHER PUBLICATIONS

Mirel Cosulschi et al., Classification and Comparison of Information Structure from a web page, Sep. 20, 2004, Annals of University of Craiova, vol. 31, 2004, pp. 109-121.*

(Continued)

*Primary Examiner* — Usmaan Saeed
*Assistant Examiner* — Jagdish Pandya
(74) *Attorney, Agent, or Firm* — Graeser Associates International Inc; Dvorah Graeser

(57) ABSTRACT

System and method for collecting information from a plurality of related sites, analyzing the information and storing the relevant information in a data base for future use. According to one embodiment of the present invention, the system uses the provided list of sites, whether obtained automatically or separately, queries them and analyzes the result retrieved from each site. The information may also optionally and preferably be ranked.

17 Claims, 11 Drawing Sheets

(56) References Cited

U.S. PATENT DOCUMENTS

| | | |
|---|---|---|
| 2006/0047649 A1 | 3/2006 | Liang |
| 2006/0161569 A1 | 7/2006 | Meyer |
| 2006/0242129 A1 | 10/2006 | Libes |
| 2006/0282455 A1 | 12/2006 | Lee |
| 2007/0078814 A1 | 4/2007 | Flowers et al. |
| 2007/0174244 A1 | 7/2007 | Jones |
| 2007/0208732 A1 | 9/2007 | Flowers et al. |
| 2007/0294240 A1 | 12/2007 | Steele |
| 2008/0033939 A1 | 2/2008 | Khandelwal |
| 2008/0033996 A1 | 2/2008 | Kesari |
| 2008/0098300 A1* | 4/2008 | Corrales et al. ............... 715/243 |
| 2009/0024574 A1 | 1/2009 | Timmons |
| 2009/0077180 A1 | 3/2009 | Flowers et al. |
| 2009/0265611 A1* | 10/2009 | Sengamedu et al. .......... 715/234 |
| 2010/0169352 A1 | 7/2010 | Flowers et al. |

FOREIGN PATENT DOCUMENTS

| | | |
|---|---|---|
| WO | WO0146870 | 6/2001 |
| WO | WO0175664 | 11/2001 |
| WO | Wo2008150692 | 12/2008 |
| WO | WO2009039392 | 3/2009 |

OTHER PUBLICATIONS

PCT Search Report for PCT/IL2009/001218.

Daniel Le et al: Combining DOM tree and geometric layout analysis for online medical journal article segmentation Proceedings of the 6th. ACM/IEEE Joint Conference on Digital Libraries. (JCDL 2006). Chapl Hill, Jun. 11-15, 2006; [Proceedings of the ACM/IEEE Joint Conference on Dogotal Libraries, JCDL], New York, NY : ACM, US, vol. CONF. 6, Jun. 1, 2006 pp. 119-128, XP031055381 ISBN: 978-1-59593-354-6 pp. 119-122 pp. 127-128.

Cattoni R et al: "Geometric Laout analysis Techniques for Document Image Understanding: a Review" Internet Citation 1998, XP002229195 Retrieved from the Internet: URL:htp://tev.itc.it/people/modena/Papers/DOC_SEGstate.pdf> [retrieved on Jan. 29, 2003] sections 2, 4, 7.

* cited by examiner

SYSTEM AND METHOD FOR AGGREGATING AND RANKING DATA FROM A PLURALITY OF WEB SITES

This Application claims priority from U.S. Provisional Application No. 61/193,862, filed on Dec. 31, 2008, hereby incorporated by reference as if fully set forth herein.

FIELD OF THE INVENTION

The present invention relates to retrieving information from web sites and in particular for automatic aggregation of information from a plurality of web sites, and optionally ranking such information.

BACKGROUND OF THE INVENTION

The Internet has become a main resource for searching for information. Web site offering services or information regarding a plurality of subjects has become very popular. Such web sites can be, for example sites offering cars for sale, real estate sites offering real estate, or social network sites enabling a user to get contact information about people of his interest.

Unfortunately, a person looking for information for a certain item, such as a car, for example has to retrieve the information from various sites and to manually combine such information. In addition some information might be redundant; For example, information regarding the same real estate might appear in more than one real estate site.

Some web sites have set up agreements with related web sites to collect information from these sites and to present this information in another site. Unfortunately, since the operation is done manually and is based on agreements, the amount of sites from which the information is collected is limited.

SUMMARY OF THE INVENTION

The background art does not teach or suggest a fully automated process, which is based on a combination of geometric and semantic analysis, done on collected information from related web sites and which provides the collected relevant information in one site.

The present invention, in at least some embodiments of the present invention, overcomes the deficiencies of the background art by providing a system and method which collects information from a plurality of related sites, analyzes the information both geometrically and semantically and stores the relevant information in a data base for future use. The geometric analysis, combined with a semantic analysis, provides a more accurate and efficient search comparing to a semantic analysis only.

According to one embodiment of the present invention, the system automatically, and preferably periodically, queries related sites and analyzes the result retrieved from each site. Such results can be retrieved from HTML/XML pages or from any other text format pages. According to this embodiment, the browser applies its rendering composer engine on the HTML document to determine one or more geometrical properties of the document, for example optionally by generating a Document Object Model (DOM) tree. The geometrical properties of such a tree are preferably analyzed to determine the layout of the document. Information is preferably then retrieved from the document according to the document layout. Optionally, semantic analysis is also applied.

According to yet another embodiment of the present invention, there is provided a method for ranking information obtained through such geometrical analysis. The method optionally features individually and separately ranking one or more records or units of information contained within the analyzed document, rather than only ranking the complete document itself. By "record" it is meant any unit of information obtained or derived from a database or other storage of information associated with or forming part of the "back office" of a website; for example the record may be an entry to a listing within the database. The unit of information preferably forms a coherent whole with regard to the domain of the data stored in the database. As a non-limiting example, for a real estate database, the record is optionally a real estate entry in the listing (for example for sale or rental of a building, office, apartment and so forth). This embodiment enables relevant information to be ranked, regardless of the document itself and its rank. Such ranking is useful when the units of information are of interest and/or when the units of information may be present in the "deep web", in which the units of information are part of web pages that are created dynamically.

As previously noted, web pages generally contain a plurality of information. Part of the information, such as related advertisements and the like, does not include relevant information. Finding relevant information can be done by semantic analysis which is based on a search of content and context relevancy, for example by searching key words. Finding relevant information can also be done by geometrical analysis, which is based on the layout of the page and on assumption about the location of the relevant information, or on a combination thereof. Unfortunately there is no system and method in the art which provides a geometrical analysis based on a pre-defined description of the location of the relevant information and based on a combination of such geometrical analysis with semantic analysis. Among the many important features of the present invention, in at least some embodiments, is that it overcomes these drawbacks of the known art.

USA Application No. 2008/0098300, filed Oct. 24, 2006, published Apr. 24, 2008, teaches a system and method for fetching relevant information from a web page by geometrically analyzing the rendered page. However this application does not teach or suggest specifically how to geometrically analyze the page and how to combine semantic analysis with geometrical analysis.

USA Patent Application No. 2006/0161569, filed Apr. 25, 2005; published on Jul. 20, 2006, teaches identifying node of interests in a tree structure, by searching relevancy of context; however this patent does not teach or suggest how to check the relevancy of data in a web page by analyzing the geometrical structure of the page.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof. For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

Although the present invention is described with regard to a "computer" on a "computer network", it should be noted that optionally any device featuring a data processor and/or the ability to execute one or more instructions may be described as a computer, including but not limited to a PC (personal computer), a server, a minicomputer. Any two or more of such devices in communication with each other, and/or any computer in communication with any other computer may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION

Figure 1:
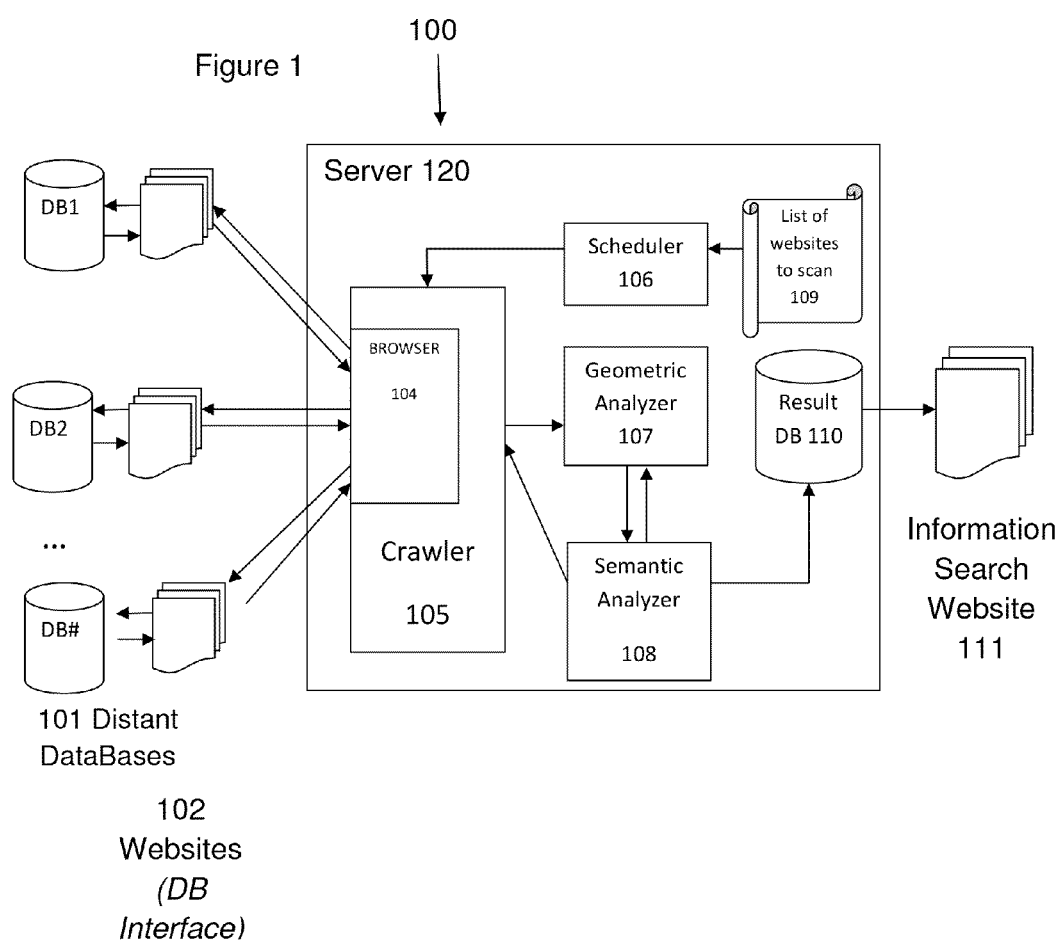
FIG. 1 is a schematic drawing of the system.

The present invention, in at least some embodiments, is of a system and method for retrieving information from web sites and in particular for automatic aggregation of information from a plurality of web sites. According to at least one embodiment, the system and method collect information from a plurality of related sites, analyze the information both geometrically and semantically and optionally store the relevant information in a data base for future use. The geometric analysis, combined with a semantic analysis, provides a more accurate and efficient search comparing to a semantic analysis only.

According to one embodiment of the present invention, the system automatically, and preferably periodically, queries related sites and analyzes the result retrieved from each site. Such results can be retrieved from HTML/XML pages or from any other text format pages. According to this embodiment, the browser applies its rendering composer engine on the HTML document to determine one or more geometrical properties of the document, for example optionally by generating a Document Object Model (DOM) tree. The geometrical properties of such a tree are preferably analyzed to determine the layout of the document. Information is preferably then retrieved from the document according to the document layout. Optionally, semantic analysis is also applied.

The Document Object Model represents an HTML or XML document in a tree structure. DOM provides a data structure that allows data separation and classification into a well defined tree structure for simplified retrieval. Optionally and preferably X, Y, coordinate positions measuring the distance in pixels from the inside browser frame to upper left hand corner of the enclosing rectangle region are associated with tree nodes. The region's width, height, left border, top border size, inner left and top margins are also optionally and featured in the tree. All the geometrical properties associated with the DOM-tree nodes are called the layout of the document.

Once the DOM-tree of the document is built, the system preferably searches for record containers within the Layout. A record container is optionally part of the layout associated with a DOM-tree node that contains portions of the layout having similar geometrical structure. The node may also optionally contain other non-record components or subareas that are also part of the layout. Furthermore, the record container may optionally feature one or more portions of the layout that are not geometrically similar to the records.

If there is more than one candidate record container, then a single record container is preferably selected by ranking the area size of the container and the closeness of the geometric center of the container to the geometric center of the layout of document; for example, a container having the largest area and having a center closest to the center of the page is highly ranked and is chosen as the record container.

Geometrical similarity between two or more layout subareas (records) is optionally and preferably at least partially determined by the rate of reoccurring elements (shapes), comprising the records. Geometrical properties preferably comprise parameters such as length, width and position. Each record is a part of the layout that presumably contains a single unit of relevant data, for example, an advertisement for a car or a listing for a building or portion thereof for sale or rent for real estate. The relevancy of a record is optionally and preferably further defined by the Semantic Analyzer according to at least some embodiments of the present invention, in which the semantic relevancy of the information contained within the record is preferably determined, such that such semantic relevancy is also preferably considered when determining the relevancy of the record.

The Geometrical similarity is preferably found by using a variation of the Scan Line algorithm. The Scan Line algorithm is an algorithm in computer graphics that operates on a row-by-row basis rather than on a pixel-by-pixel basis. All of the shapes are first sorted by the top x coordinate at which they first appear, then each row or scan line of the image is computed using the intersection of a scan line with the geometrical shape.

Next the system preferably divides the records within the chosen record container into groups. Records having the same geometrical pattern are preferably identified as belonging to the same group. The process of defining groups and geometrical pattern is preferably done by identifying geometrical rectangles, or other geometrically defined shapes, within the record container and by ordering the rectangles, preferably by using scan line algorithm.

The system preferably performs semantic analysis on a representative record or a set of records from each group. If the representative record (set of records) is found to be relevant, then the relevant data from all group members, as well as the pattern of the group (the structure which identifies the group) is preferably stored for further retrieval of data. Semantic analysis is done, for example and without wishing to be limited in any way, by searching key words or a combination thereof or by using semantic web techniques. For example; if the system aggregates information from web pages dealing with flights, the system preferably searches for key words such as flight number, seats, arrival and the like. If such key words are found, then the geometrical pattern is preferably identified as relevant and data from all the instances of this pattern is preferably kept in the data base.

According to other embodiments of the present invention, once a pattern is identified on one page, the system can identify records with identical patterns in the next pages and preferably, by assuming the same textual structure on these patterns fetches the relevant data without further analyzing.

According to other embodiments of the present invention, the system saves the retrieved data in a database. Once a user queries the data, preferably by using a dedicated web site, it is retrieved from the data base. The query results preferably comprise information retrieved from related sites as well as links to these sites.

According to yet another embodiment of the present invention, there is provided a method for ranking information obtained through such geometrical analysis. The method optionally features individually and separately ranking one or more records or units of information contained within the analyzed document, rather than only ranking the complete document itself. This embodiment enables relevant information to be ranked, regardless of the document itself and its rank. Such ranking is useful when the units of information are of interest and/or when the units of information may be present in the "deep web", in which the units of information are part of web pages that are created dynamically.

Turning now to the drawings, FIG. 1 is a schematic drawing of an exemplary, illustrative system according to the present invention. System 100 features a server 120, which communicates with external databases 101 through web site interface 102 in order to fetch data from related sites. Server 120 features a crawler process 105 for fetching data from a provided list of related web sites 109. Such a list 109 can optionally reside in a file or alternatively be collected by another crawler. Scheduler 106 schedules the crawler 105 to automatically query the data bases 101 via the web sites interface 102 in order to retrieve relevant data. Such data can be, for example, higher education programs which are available by querying web sites of universities. Crawler process 105 optionally and preferably uses the API of browser 104 in order to communicate with the external databases 101 and to render the pages. Rendering is a process, known in the art, which generates the layout of the page, based on hierarchies that reside in the DOM (Document object model) and geometrical information associated with it, which is retrieved according to the web page data, received from web sites 109. The hierarchical information specifically resides in the DOM-tree; each mark-up language tag (such as each HTML or XML tag) is associated with a node in the DOM-tree. For each node in the tree, the browser 104 also associates its geometrical representation for rendering the corresponding web page. The geometric representation is denoted by the XY origin offset, width, height and the like.

Figure 3:
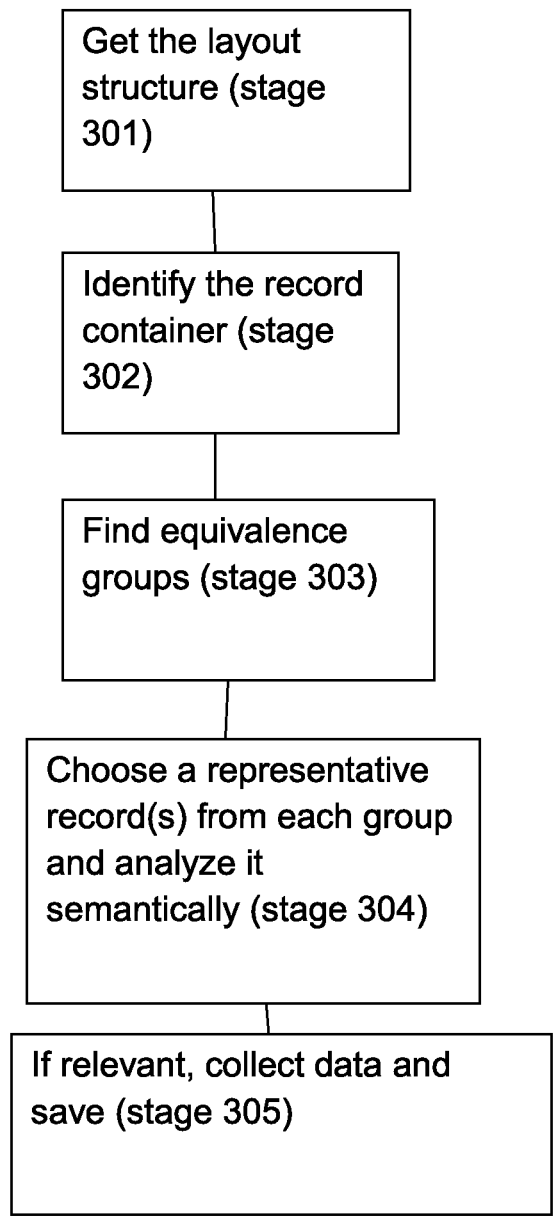
FIG. 3 is a high level flow diagram describing the page analysis.

Crawler 105 transfers the rendered page, including the DOM-tree along with page geometric representation, to the geometrical analyzer process 107 which finds the relevant layer to be textually analyzed by the semantic analyzer 108, as explained in greater detail in FIG. 3. Semantic analyzer process 107 preferably communicates with geometric analyzer process 107 in order to receive the groups having the same pattern and analyze each group. Semantic analyzer process 107 also preferably communicates with crawler 105 (the crawler 105 searches for a link to the next results page preferably only if the page has been identified as a relevant results page).

The results of the analysis which comprise records, data and links to the relevant web pages, are preferably stored in the result data base 110. When a user queries for information, such as, for example a list of all higher education programs in the user's area, using the search website 111, the information is retrieved from the result data base 110. The information preferably comprises data and links to relevant sites for retrieving additional data, according to the analysis performed above.

Figure 2:
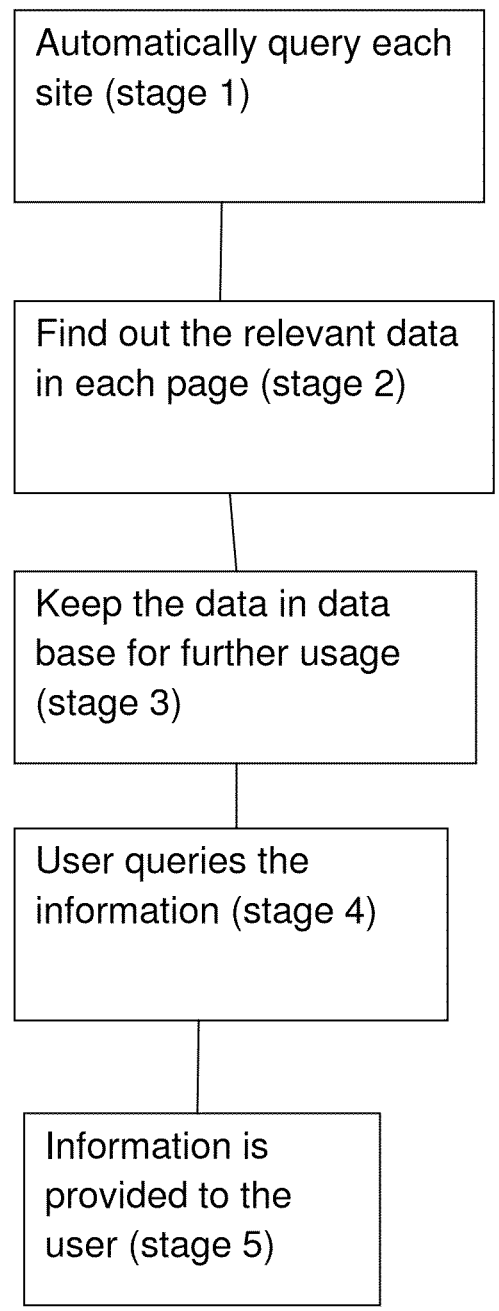
FIG. 2 is a schematic flow diagram describing the building of a data base with regard to a specific site.

FIG. 2 is a diagram of an exemplary, illustrative embodiment of a schematic flow process describing the building of a data base with regard to a specific website. The system works on a list of related sites for a specific area, for example, a list of real estate sites. In stage 1, the system automatically and periodically queries each related site from a given list of sites. Querying is done by, preferably using a crawler which goes over a list of site URLs, preferably by using web browsers like Microsoft Internet Explorer, Mozilla Firefox and the like. The crawler preferably builds a rendered page, based on the DOM (Document Object Module) of the document specified by the web site's URL, provided by the browser (the web browser is preferably embedded in the crawler, although optionally these components could be separate and could communicate for the operation of the crawler).

In stage 2, the system looks for the relevant data in the document specified by the web site's URL, by identifying geometrical patterns from the rendered page and by extracting data from the patterns. This method is explained in greater detail in FIG. 3. In stage 3, the data and the links to the data are preferably kept in the system's data base for further use. If relevant data is found in the home page then the crawler fetches the next pages and stages 2-3 are repeated for each of the next pages. Stages 1 and 2 are preferably repeated for each web site that is found by the crawler. In stage 4, a user queries for information, (for example real estate information), preferably by using a dedicated web site that is provided by the system. In stage, 5 the system provides all the related information from the database as well as the links to the relevant web sites. The system preferably provides brief information on each saved record in a page; in order to view the record itself, the user is redirected to the original webpage, where the record has been found.

FIG. 3 is a high level flow diagram describing the page analysis. In stage 301, the geometric analyzer obtains the layout of the page from the embedded browser rendering engine, according to information that resides in the DOM (Document object module), which is retrieved from the web page, preferably including the DOM-tree as previously described. In stage 302, the layout is analyzed to locate one or more records by geometric analyzer. Each record represents a unit of information. Such a record can optionally be, for example, an advertisement for a car to be sold through a dealership web site.

In stage 303, the geometric analyzer preferably searches for specific record containers according to the located records. The record is geometrically presented as structure located inside the record container.

Figure 5:
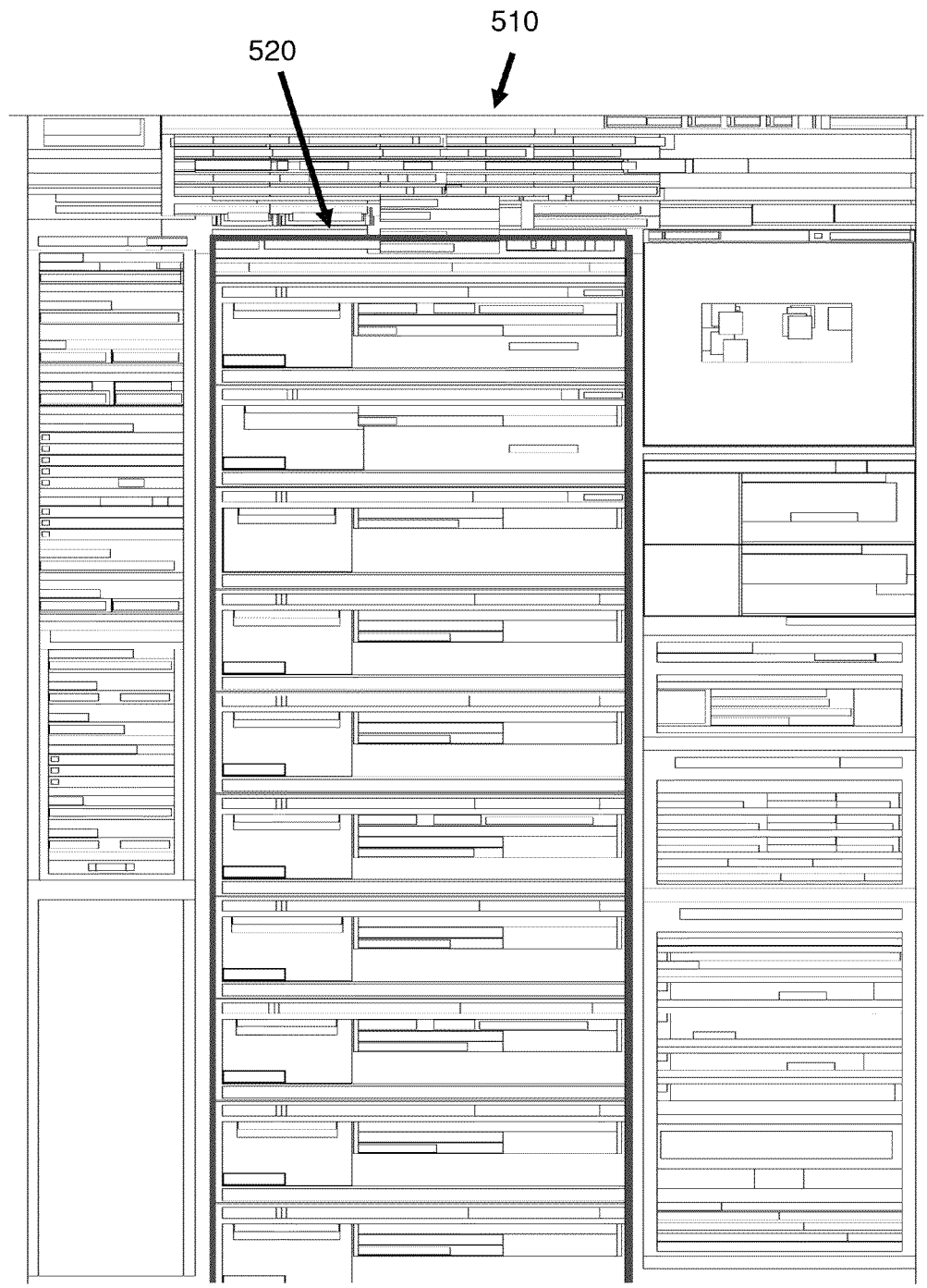
FIG. 5 (and FIG. 5 con't) is a diagram illustrating the chosen record container within the page.
Figure 5:
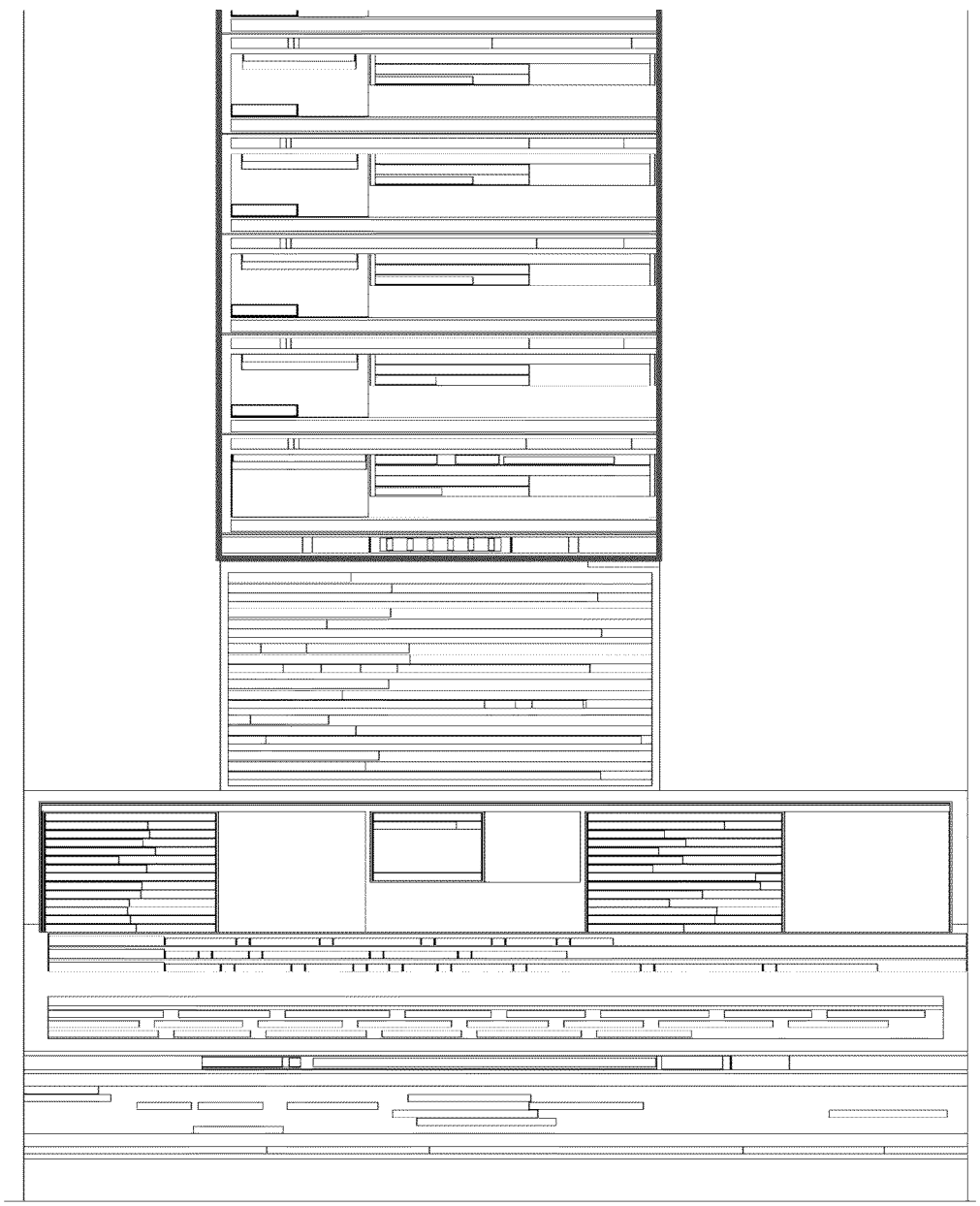

The method preferably searches for record containers which contain records that are geometrically similar to each other, by assuming that the relevant data resides in such a record container. If there is more than one candidate container, then a record is preferably selected according to one or more geometrical properties of the record; for example, optionally the larger and more central one which is closer to the geometrical center of the page is selected. An exemplary, illustrative record container is illustrated in FIG. 5.

Figure 6:
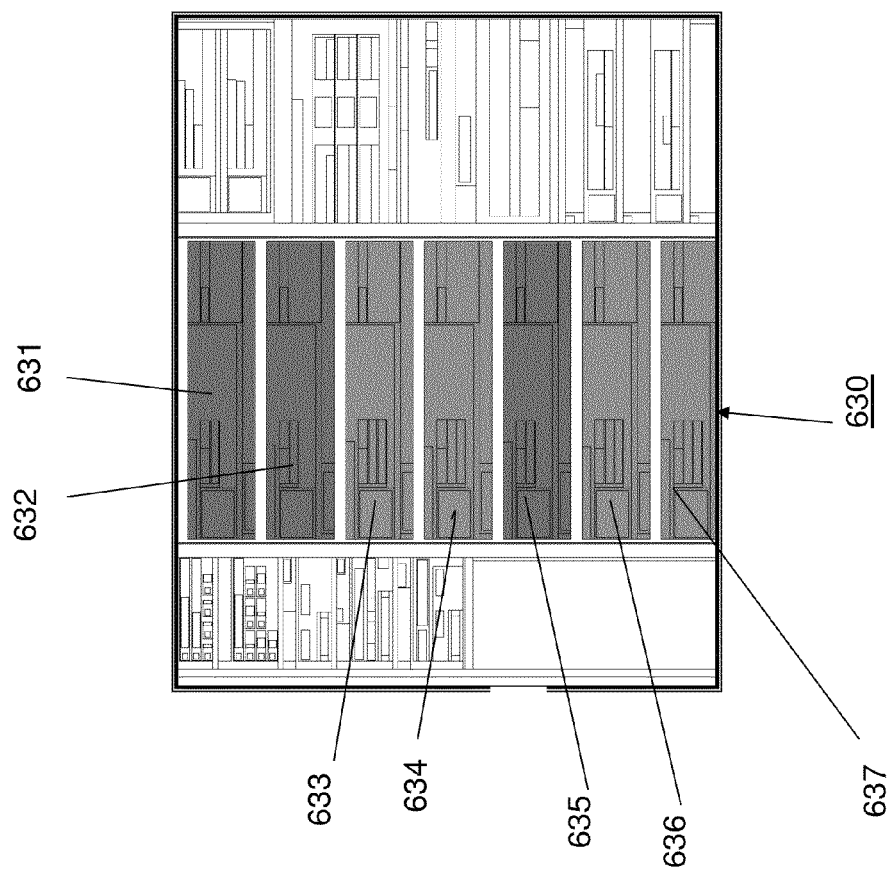
FIG. 6 is a diagram illustrating the groups within the record container.

In stage 304, the groups of rectangles (records) having the same geometrical pattern are determined within the chosen record container. The system preferably orders all the rectangles (records) inside the records container by their coordinates. Next the rectangles are separated from each other. The rectangles having the same geometrical structure are defined as belong to the same group which is identified by a unique geometrical pattern. The dividing of the record container into groups is illustrated in FIG. 6. In stage 305, a representative record, or a set of records, is chosen from each group, defined in stage 304, and is analyzed semantically. In stage 306, if the representative record or set of records is found to be relevant by the semantic analyzer, then the relevant data from all group members, as well as the pattern of the group (the structure which identifies the group) is stored for further retrieval of data. Stages 305 and 306 are repeated for every group.

If data records are represented in a table, for example, the geometric analyzer preferably analyzes the records according to this geometrical structure, for example by associating each record with a table row. The semantic analysis identifies the header row of the table and the geometrical location (offset) of every header entry. When analyzing non-header rows, each column is associated with the corresponding header entry using the offset of the column. This technique ensures accurate record extraction from tables.

Figure 4:
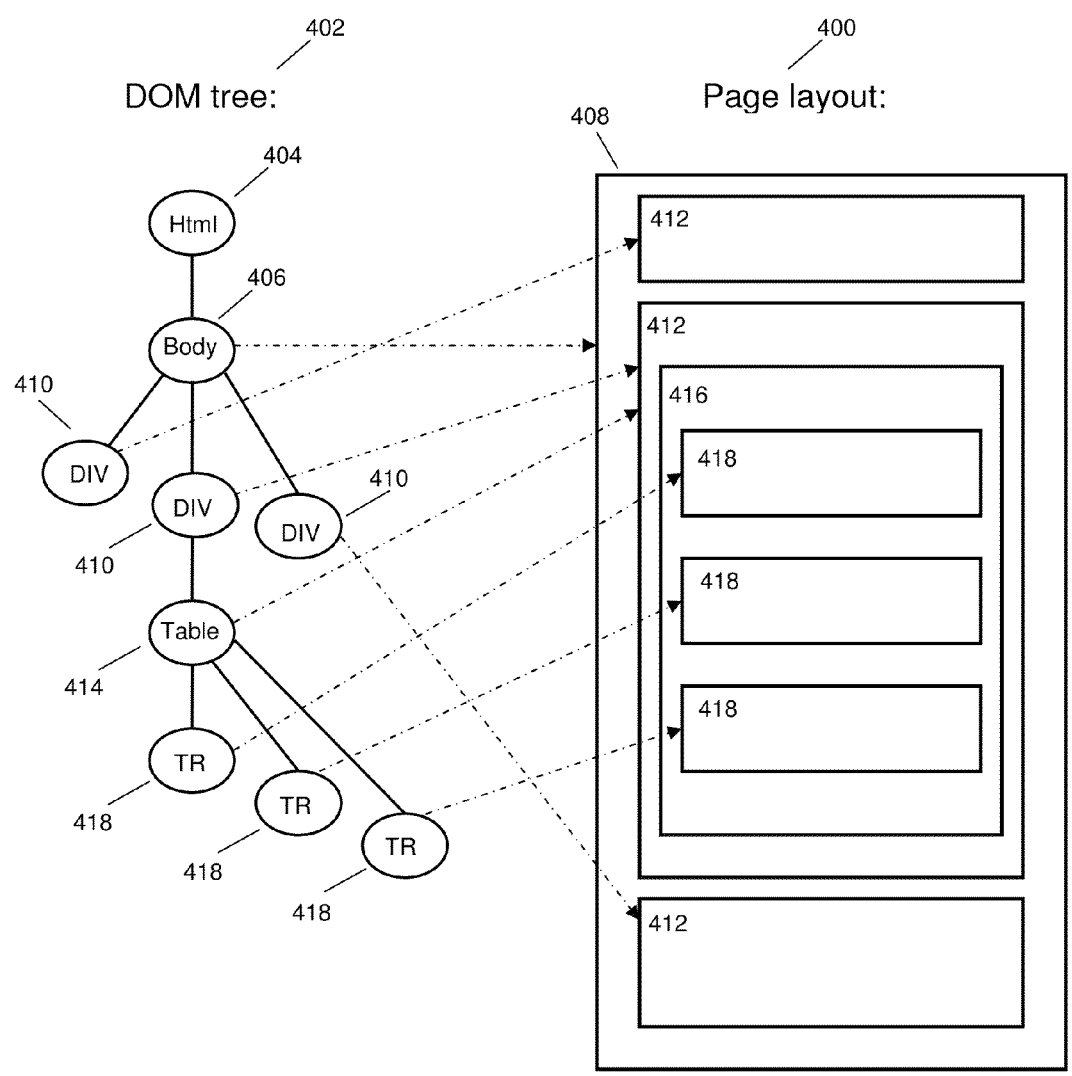
FIG. 4 is a diagram illustrating a rendered page.

FIG. 4 is a diagram illustrating a rendered page. A rendered page 400 is preferably generated from a rendering engine (not shown). Rendering is done by combining geometrical and structural information which is retrieved from the DOM. The structural information is provided by the DOM (Document Object Model) by a hierarchal tree (shown as DOM tree 402), while the geometrical information is provided by the DOM by assigning coordinates to each node in the tree 402. The correspondence between DOM tree 402 and rendered page 400 is shown.

The root node of DOM tree 402 is HTML 404. HTML 404 features a body 406 which corresponds to a page layout 408. Body 406 features a plurality of DIV nodes 410, each of which represents a division 412 within rendered page 400. One of the DIV nodes 410 features a table node 414, which corresponds to a table 416 within rendered page 400. Table node 414 in turn features a plurality of TR (table row) nodes 418, which correspond to table rows 418 of table 416.

FIG. 5 illustrates the record container 520 within a rendered page 510. Record container 520 is identified as the record having the most organized inner structure within the rendered page, by having sub trees of records (inner rectangles) which are similar to each other.

FIG. 6 illustrates groups within a record container. Each group contains records (having the same inner geometrical structure. In the figure, records 631, 632 and 635 within the record container 630 belong to one group, while records 633, 634, 636 and 637 belong to another group.

Figure 7:
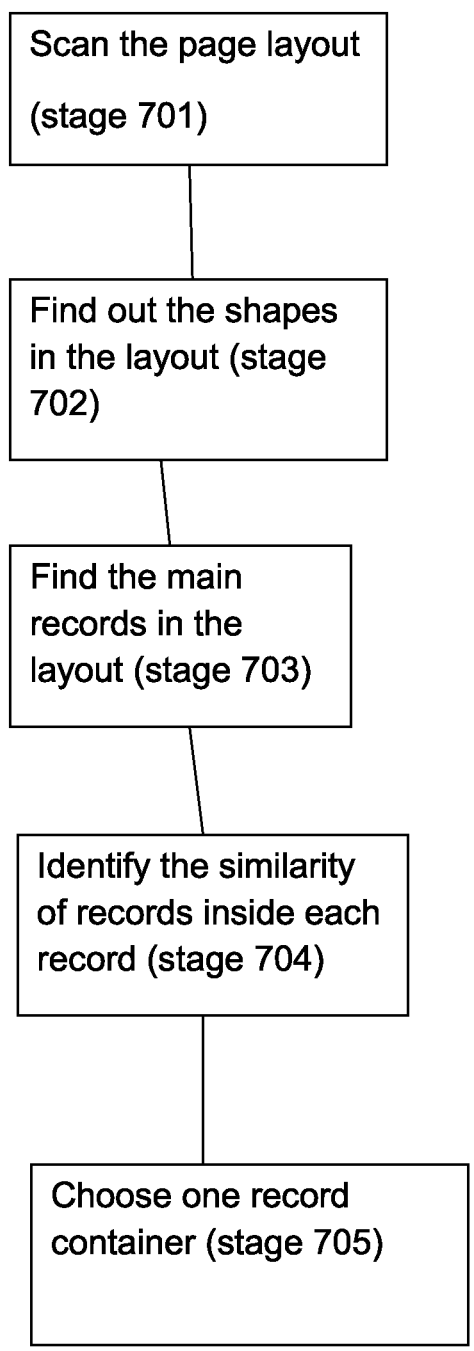
FIG. 7 is an exemplary diagram describing the process of identifying a record container.

FIG. 7 is an exemplary diagram describing the process of identifying a record container. In stage 701, the layout of the page is generated by the rendering process. In stage 702 the document layout is geometrically scanned by, for example, using scan-line algorithm, in order to find similar areas in the layout. In stage 703, the DOM-tree nodes containing similar regions are identified as candidate record containers. In stage 704, the record container is chosen from candidates by ranking the area size of the container and closeness of the geometric center of the container to the geometric center of the layout of document; for example container having a larger area and a center closest to the center of the page is ranked with a high rate and is chosen as the record container.

Figure 8:
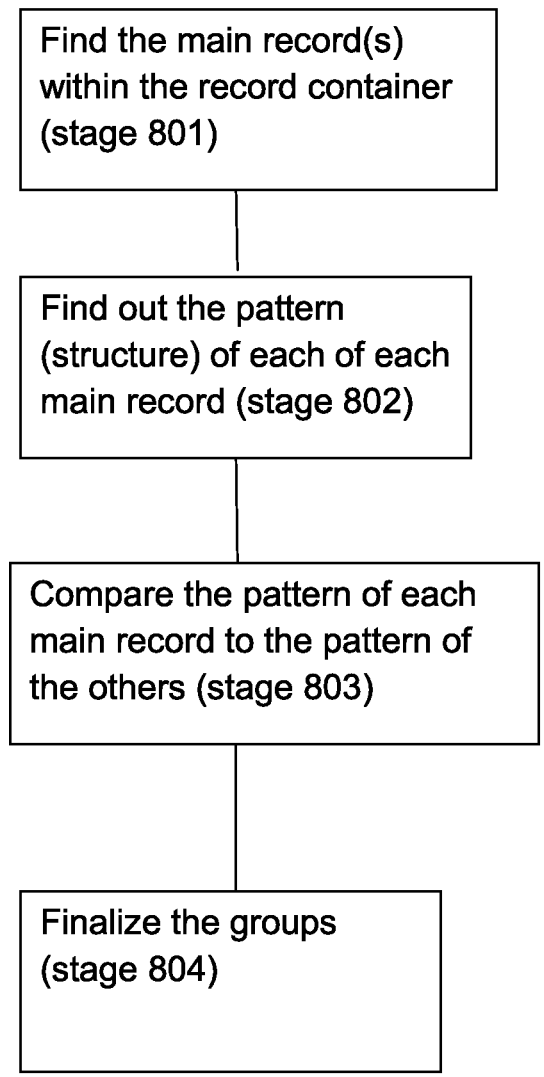
FIG. 8 is a diagram describing an exemplary process of identifying groups within the record container.

FIG. 8 is a diagram describing the process of identifying groups within the record container. In stage 801, the geometrical structure for each record within the record container is found. In stage 802, the records are grouped according to their geometrical structure, such that records having similar structures are placed into the same group. In stage 803, a representative record or set of records is preferably selected from each group of records. In stage 804, the representative record or set of records is analyzed semantically to determine the contents of each representative record or set of records. In stage 805, the results of the analysis are preferably stored with the structures in the system database for later retrieval, for example for analysis of other records having the same or similar structure.

Figure 9:
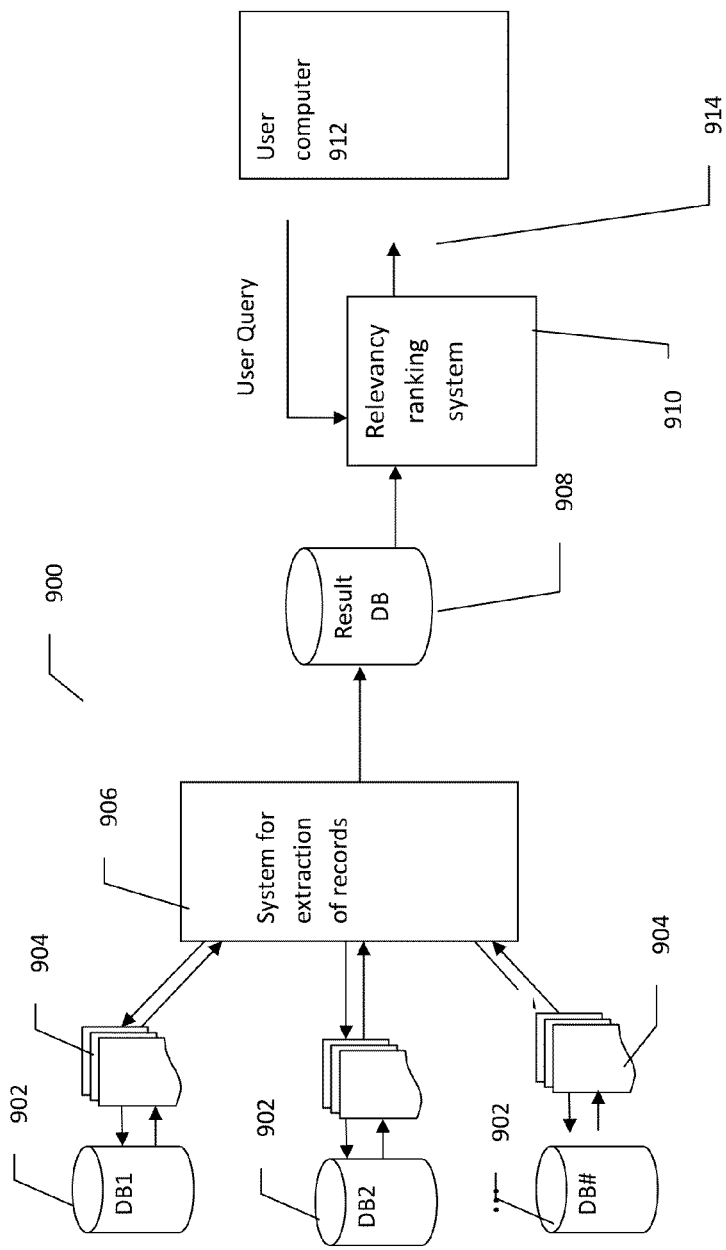
FIG. 9 shows an exemplary, illustrative process for ranking the records according to a combination of semantic analysis and also the geometric properties of the record within the document, according to at least some embodiments of the present invention.

According to some embodiments of the present invention, the records may optionally be ranked according to a combination of semantic analysis and also the geometric properties of the record within the document, determined as described above. As shown in FIG. 9, a process 900 preferably features analysis of a plurality of records 904 from a plurality of databases 902. Databases 902 may optionally comprise any type of information available through a computer network as described above, for example the Internet, optionally and more preferably including the so-called "deep web", which are records obtained from dynamically generated web pages.

A system 906 preferably extracts records 904 from databases 902. System 906 optionally and preferably operates as previously described, in order to extract the records and also to determine their geometrical properties, more preferably also including the geometrical properties of the record with regard to the document layout of the document in which the records are located. The information determined by system 906 is preferably stored in a results database 908.

A relevancy ranking system 910 preferably analyzes the information in results database 908 to rank the records obtained as described above. Relevancy ranking system 910 preferably at least uses a semantic comparison, described in greater detail with regard to FIG. 10, and also ranking based upon geometric properties of each record, to determine the relevancy ranking of a plurality of records. With regard to geometric properties, preferably at least the prominence of a record on the original document is determined from the geometric properties of the record with regard to the layout of the document, and is used for ranking. Such prominence relates to one or more decisions made by the constructor of the website regarding the importance of the record; more prominent records are presumably more important.

Prominence is preferably determined according to the previously described geometrical pattern and location information for each record. For a given website and its records, relevancy ranking system 910 may evaluate the prominence of each pattern by combining the average depth of a pattern and the number of records having such a pattern.

As an illustrative non-limiting example, website X is scanned daily and 1000 records are extracted. Records are divided into two groups in this example: records with pattern A and records with pattern B. Suppose that there are 990 records with pattern A and they have been extracted from pages one to fifty (average depth of pattern A is 25), while there are only ten records having pattern B that appear only on the first page (average depth of pattern B is 1). A number of formulae may be applied on this data to calculate the prominence of a pattern (group of records). The records having pattern B may be supposed to be more prominent, given that they only appear on the first page of a group of pages.

Similar analyses may optionally be applied to a location within a web page (top and center, or bottom and to one side, in which the top and center position may optionally be determined to be more prominent); size of the record, with larger records being considered to be more prominent; and optionally also type of information contained within the record. With regard to the type of information, preferably prominence is associated with information type according to the domain of information contained within the record. For example, for the domains of real estate advertisements and automobile advertisements, optionally and preferably the inclusion of a photograph or other type of image increases the prominence of a record, since typically such image(s) would be used for more important items, given that they consume space on the web page. However, for other domains such as "help wanted" advertisements, the presence of an image would not necessarily signal increased importance of the record, in which case this type of information would preferably not be used to determine the prominence of a record.

Optionally, relevancy ranking system 910 may also use "freshness" of a record, since records being extracted with an older date are less likely to be relevant; furthermore, their presumed relevancy decreases with age. Therefore, newer records preferably receive a higher score for this attribute.

Optionally, relevancy ranking system 910 may also use the source of a record for ranking, preferably both by popularity and reliability. For example one may use a Google rank of a website main page URL or estimate its network traffic to determine popularity. This attribute also allows giving higher priority to records that appear simultaneously on a number of websites, for example by combining the Google rank of web site a record appear at thus assigning it higher rank.

With regard to reliability, optionally such ranking may be determined manually or according to an automatic analysis that is external to relevancy ranking system 910; for example, news websites are sometimes ranked by external agencies according to the reliability of information contained therein. Such external third party rankings may optionally be included to determine reliability of a particular website as a source for records.

Optionally, relevancy ranking system 910 may also use the completeness of records, which is the extent to which items have provided values in a record; as more items are defined in a record (such that the record has fewer τ or null variables), the greater the rank of the record according to this parameter. For example, if the record is of a type that may include an image, preferably records featuring an image receive a greater rank than records without an image.

When a user submits a query through a user computer 912, which optionally and preferably communicates with relevancy ranking system 910 through a network 914 such as the internet for example, the query is preferably compared to the records as ranked by relevancy ranking system 910. Such ranking is preferably performed both according to semantic analysis of the query and of the records, and also preferably according to the geometrical information that was analyzed by relevancy ranking system 910. This process is described in greater detail with regard to FIG. 10. The answer is then preferably returned to user computer 912, for display to the user.

Figure 10:
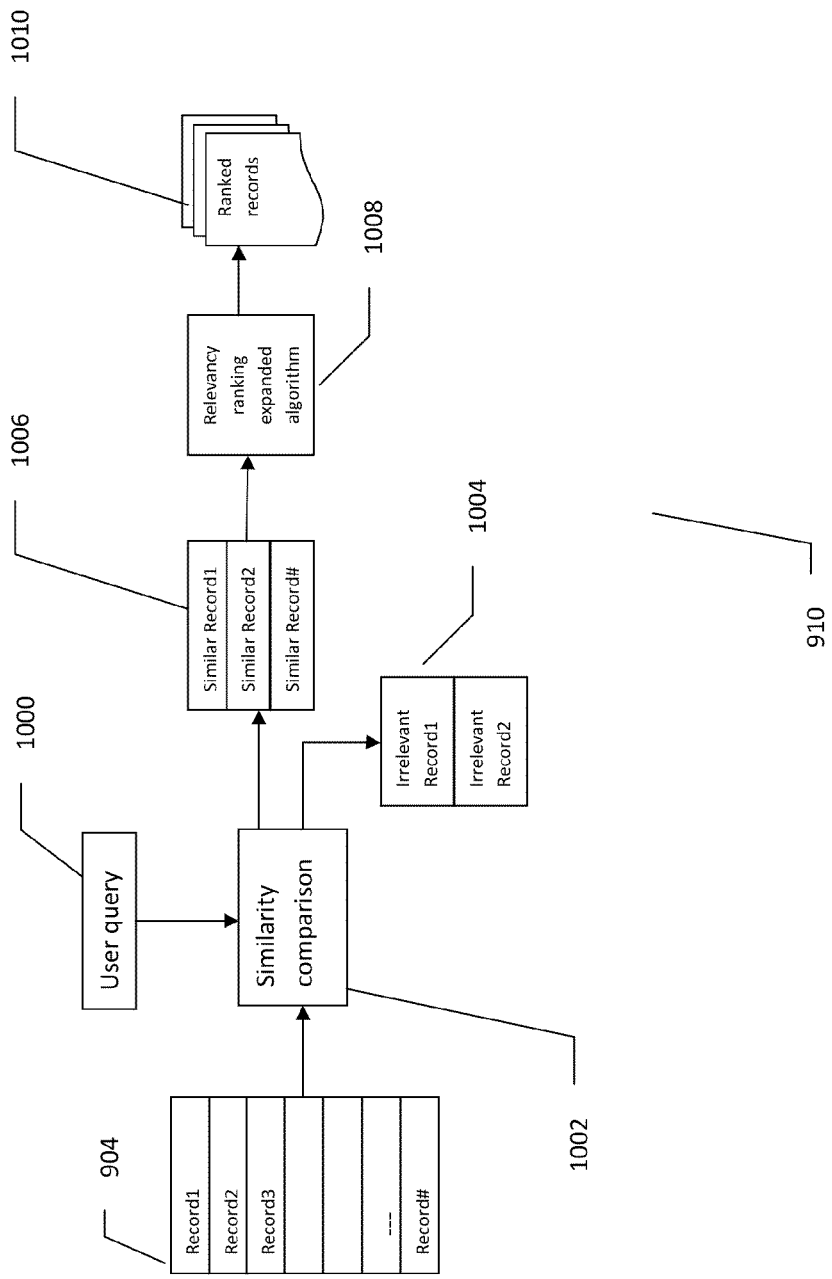
FIG. 10 describes an exemplary, illustrative process for performing relevancy ranking system 910 according to at least some embodiments of the present invention.

FIG. 10 describes an exemplary, illustrative process for performing relevancy ranking system 910 according to at least some embodiments of the present invention. As shown, information from a plurality of records 904 is compared to a user query 1000 by a similarity comparison module 1002, which may optionally be operated by any type of computer or a plurality of computers. Similarity comparison module 1002 preferably sorts records 904 into one or more irrelevant records 1004 and one or more relevant records 1006 as follows.

Preferably, similarity comparison module 1002 (or another module operating separately, optionally and preferably upstream before similarity comparison module 1002) separates records 904 into a plurality of domains. Every domain is optionally and preferably defined by a set of items $<i_1, i_2, \ldots, i_n>$ For example, for real estate records the following items may optionally be defined: property type, price, address, floor, area, etc. For the domain of used automobiles, one may optionally define items like car model, price, motor volume and mileage. Items may be different for different domains, although of course one or more items may optionally occur in a plurality of domains.

A record of the plurality of records 904 in the database is preferably represented as a vector of variables $R=<r_1, r_2, \ldots, r_n>$. Each variable $r_k$ contains a value for a specific item $i_k$. Records may not contain information on some of the items describing the domain. If this information is lacking or absent, then the value of the variable corresponding to the missing item is preferably assigned a special null value, such as ø (as described above).

The user query is also preferably transformed by similarity comparison module 1002 into a vector of variables $Q=<q_1, q_2, \ldots, q_n>$ describing specific domain items. The user query as well may not contain some of the items defined for a given domain, in which case again the value of the variable corresponding to the missing item is preferably assigned a special null value, such as ø (as described above). For example, one may search for 3-bedroom apartments in London regardless of price or specific property area; the missing values of price and specific property area are preferably converted to the null value.

When similarity comparison module 1002 receives a query $Q=<q_1, q_2, \ldots, q_n>$, the similarity rate SR(Q,R), (SR(Q,R) $\in$ [0,1]) of the query is preferably calculated for each of the records of the plurality of records 904 in the database. The similarity rate is a product of similarity rates for each query-record pair of variables of an item: $SR(Q,R)=\Pi sr(q_k,r_k)$. The similarity rate of an item is calculated differently for different types of items.

Optionally, different weights may be assigned to various items; in this case a new factor (power) for each item is preferably provided for such differential weighting: $SR(Q,R)=\Pi sr^{w_k}(q_k,r_k)$.

For some items the similarity rate may be defined by strict comparison of variables and may be assigned only binary values, such as for example, the number of bedrooms of a property or a car brand.

In other items a loose comparison can be made. In numerical items simple comparison of numbers may be used. For example if someone looks for a property with price of 300K USD (US dollars), such a user is likely to be interested in seeing properties with prices of 305K USD or even 270K USD. In this case the similarity rate may be calculated using the following formula:

$$sr_k = \frac{\min(r_k, q_k)}{\max(r_k, q_k)}.$$

For non-numerical items, the similarity rate may be calculated by text similarity algorithms like cosine similarity or inverse document frequency (IDF).

In case of a generic domain there is preferably only one item, which is free text. Both records and query are then preferably defined by a single variable that will be compared by text similarity algorithms.

If the query variable $q_k=\emptyset$, it is preferably not considered for SR(Q,R), since $sr(q_k,r_k)$ is the same for all records and will not affect the relevancy order. If record variable $r_k=\emptyset$ than $sr(q_k,r_k)$ preferably receives a predefined value $\tau_k$, $\tau_k \in (0,1)$. It is evident that it cannot get values 0 or 1 (it cannot be considered as irrelevant, but it also cannot receive the full rank, as records having the same value as in query for this item should be ranked higher)

After the calculation of SR(Q,R), records are preferably divided into two groups, as previously described. The records with low SR(Q,R) (lower than a predefined threshold, for example—0.1) are considered as irrelevant (shown as irrelevant records 1004) and will not be presented to user. Records with high similarity rate (shown as relevant records 1006) will be ranked by the extended relevancy ranking module 1008 (combining extra parameters of ranking relevancy in addition to similarity rate).

The extended relevancy record ranking EXR(Q,R) is calculated via the following formula: $EXR(Q,R)=\Sigma_{i=1}^{m} w_i a_i$, where vector of ranking attribute variables $A=\langle a_1, a_2, \ldots, a_m \rangle$ is multiplied by relative weights vector $W=\langle w_1, w_2, \ldots, w_m \rangle$. Attribute variable $a_i$ is a real number $a_i \in [0,1]$ describing the rank of a record according to specific trait (attribute). Weight factor $w_i$ describes the relative weight of the attribute in the ranking calculation. Weighting factors are real numbers $w_i \in [0,1]$ such that $\Sigma_{i=1}^{m} w_i = 1$. The specific attributes may optionally feature weighting as determined by similarity comparison module 1002, optionally with one or more of geometrical properties of the record, "freshness", ranking of the source website according to reliability and/or popularity, completeness of the record, prominence of the record within the website and so forth.

The finally sorted and ranked records 1010 may optionally be provided to the user, for example according to a cut off of some minimal ranking.

While the invention has been described with respect to a limited number of embodiments, it will be appreciated that many variations, modifications and other applications of the invention may be made.

What is claimed is:

1. A method for automatically collecting data from a plurality of targeted web sites to aggregate said data; the method comprising a plurality of stages:
   automatically and periodically querying for said data from a plurality of related sites, said related sites comprising at least one web page that was not previously analyzed;
   analyzing the results from said querying, said results comprising at least one webpage, said analyzing comprising: geometrical analyzing of a page layout of the webpage, wherein said geometrical analyzing comprises determining one or more geometrical properties of the webpage, wherein said determining one or more geometrical properties comprises decomposing said page layout of the document into a plurality of layout subareas to render said page layout to form a rendered layout, determining one or more rectangles in each of said layout subarea, and determining height, width and position of each of said rectangles to form said geometrical properties of said rendered layout;
   locating recurring patterns of said rectangles in said rendered layout;
   searching for a plurality of record containers within said recurring patterns of said rectangles according to said layout subareas wherein said record containers are defined as having an organized inner structure of said rectangles;
   selecting a record container to form a selected record container;
   semantically analyzing a record from said selected record container to form a previously semantically analyzed record if a previously semantically analyzed record is not stored;
   determining a relevancy of a record to form a relevant record from said selected record container according to said one or more geometrical properties by comparing said recurring patterns of said rectangles and said organized inner rectangles of records to said recurring patterns of said rectangles and said organized inner rectangles of records of a previously semantically analyzed relevant record;
   storing the relevant record data in an aggregated data base to aggregate said data;
   storing said recurring patterns of rectangles to form stored recurring patterns of rectangles;
   comparing recurring patterns of rectangles on said at least one webpage that was not previously analyzed to said stored recurring patterns of rectangles to search for a match;
   if no match is found, performing said above stages of the method for said at least one webpage that was not previously analyzed; and
   retrieving said data from said aggregated data base, upon demand from user.

2. The method of claim 1, wherein said determining said relevancy of a record to form a relevant record from said selected record container further comprises:
   dividing said records into groups, each group having said recurring pattern of said rectangles;
   the method further comprising semantically analyzing a representative record from each said group; and
   wherein if the outcome of said semantic analyzing identifies relevant data, saving said data and said recurring pattern of said rectangles in a data base.

3. The method of claim 1 wherein said identifying said relevancy of said record comprises ordering said records inside said record container and separating them, using line boundaries.

4. The method of claim 3 wherein groups having an identical pattern in other pages are assumed to have the same semantic structure, such that data from said groups is fetched without further semantic analyzing by comparing said recurring patterns of said rectangles to a previously semantically analyzed relevant record.

5. The method of claim 4, wherein said selecting said record container to form said selected record container further comprises determining a size of an area of said selected record container to form an area size; ranking the area size of the container and the closeness of a geometric center of the container to a geometric center of the layout of document; and wherein said selecting a record container to form a selected record container comprises selecting a record container according to said ranking to form said selected record container.

6. The method of claim 1, further comprising receiving a query from a user at said aggregated database and comparing said query to a plurality of records; and ranking a plurality of records according to said recurring patterns of said rectangles for said comparing said query.

7. The method of claim 6, further comprising ranking a plurality of records according to one or more of "freshness", ranking of the source website according to reliability and/or popularity, completeness of the record, or prominence of the record within the website.

8. The method of claim 6, further comprising ranking said plurality of records according to a plurality of weighted attributes, wherein said weighted attributes are determined by weighting of the traits of the data within the record.

9. The method of claim 6, further comprising analyzing said user query to decompose said query to a plurality of items; analyzing each record to decompose said record to a plurality of items; and comparing values of said items for said user query and for said record.

10. The method of claim 9, wherein said comparing said query to a plurality of records further comprise representing each record and said query as a vector of variables, said variables having differential weighting; and comparing said vectors of variables to determine their similarity.

11. The method of claim 1, further comprising ranking a plurality of records according to "freshness", wherein a newer record receives a higher ranking than an older record.

12. The method of claim 1, wherein said locating recurring patterns of said rectangles in said rendered layout further comprises determining boundaries of each pattern of rectangles in said rendered layout; and visually displaying said boundaries of said patterns of rectangles.

13. The method of claim 1, wherein said determining said relevancy of said record to form said relevant record from said selected record container comprises comparing recurring patterns of said rectangles to find a recurring pattern wherein said rectangles are organized similarly.

14. The method of claim 13, further comprising after said determining said relevancy of said record to form said relevant record from said selected record container, extracting said relevant record and said record data according to said recurring patterns of rectangles.

15. The method of claim 13, wherein said comparing recurring patterns of said rectangles to find a recurring pattern wherein said rectangles are organized similarly comprises matching said recurring pattern of rectangles.

16. A system for automatically collecting data from a plurality of targeted web sites to aggregate said data; comprising:
 a data base and a processor, said processor performing the following processes,
  a. a crawler process for fetching data from a provided list of related web sites, said related sites comprising at least one at least one web page that was not previously analyzed;
  b. a geometrical analyzer process for analyzing said data, said data comprising at least one webpage, said analyzing comprising: geometrical analyzing of a page layout of the webpage, wherein said geometrical analyzing comprises determining one or more geometrical properties of the webpage, wherein said determining one or more geometrical properties comprises decomposing said page layout of the document into a plurality of layout subareas to render said page layout to form a rendered layout, determining one or more rectangles in each of said layout subareas, and determining height, width and position of each of said rectangles to form said geometrical properties of said rendered layout;
  locating recurring patterns of said rectangles in said rendered layout;
  searching for a plurality of record containers within said recurring patterns of said rectangles according to said layout subareas wherein said record containers are defined as having an organized inner structure of said rectangles;
  selecting a record container to form a selected record container;
  semantically analyzing a record from said selected record container to form a previously semantically analyzed record if a previously semantically analyzed record is not stored:
  determining a relevancy of a record to form a relevant record from said selected record container according to said one or more geometrical properties by comparing said recurring patterns of said rectangles and said organized inner rectangles of records to said recurring patterns of said rectangles and said organized inner rectangles of records of a previously analyzed relevant record;
  storing said recurring patterns of rectangles to form stored recurring patterns of rectangles;
  comparing recurring patterns of rectangles on said at least one webpage that was not previously analyzed to said stored recurring patterns of rectangles to search for a match;
  if no match is found, performing said above stages of the method for said at least one webpage that was not previously analyzed; and
  c. a semantic layer for textually analyzing said relevant record to retrieve information;
  wherein said data base stores the information retrieved by said semantic layer.

17. A method for automatically collecting data from a plurality of targeted web sites to aggregate said data; the method comprising a plurality of stages:
 automatically and periodically querying for said data from a plurality of related sites, said related sites comprising at least one web page that was not previously analyzed;
 analyzing the results from said querying, said results comprising at least one webpage, said analyzing comprising: geometrical analyzing of a page layout of the webpage, wherein said geometrical analyzing comprises determining one or more geometrical properties of the webpage, wherein said determining one or more geometrical properties comprises decomposing said page layout of the document into a plurality of layout subareas to render said page layout to form a rendered layout, determining one or more rectangles in each of said layout subareas, and determining height, width and position of each of said rectangles to form said geometrical properties of said rendered layout;
 locating recurring patterns of said rectangles in said rendered layout, wherein said recurring patterns of rectangles do not have a geometrically fixed position within the webpage;
 searching for a plurality of record containers within said recurring patterns of said rectangles according to said layout subareas wherein said record containers are defined as having an organized inner structure of said rectangles;

selecting a record container to form a selected record container;

semantically analyzing a record from said selected record container to form a previously semantically analyzed record if a previously semantically analyzed record is not stored:

determining a relevancy of a record to form a relevant record from said selected record container according to said one or more geometrical properties by comparing said recurring patterns of said rectangles and said organized inner rectangles of records to said recurring patterns of said rectangles and said organized inner rectangles of records of a previously analyzed relevant record, wherein only said recurring patterns are compared and not a location of said rectangles within the webpage;

storing the relevant record data in an aggregated data base to aggregate said data;

storing said recurring patterns of rectangles to form stored recurring patterns of rectangles;

comparing recurring patterns of rectangles on said at least one webpage that was not previously analyzed to said stored recurring patterns of rectangles to search for a match, wherein only said recurring patterns are compared and not a location of said rectangles within the webpage;

if no match is found, performing said above stages of the method for said at least one webpage that was not previously analyzed; and retrieving said data from said aggregated data base, upon demand from user.

* * * * *